STATION NUMBER IDENTIFIER

Filed Jan. 6, 1953 4 Sheets-Sheet 1

INVENTOR
W. H. T. HOLDEN
BY
[signature]
ATTORNEY

INVENTOR
W. H. T. HOLDEN
BY
ATTORNEY

March 20, 1956 W. H. T. HOLDEN 2,739,187

STATION NUMBER IDENTIFIER

Filed Jan. 6, 1953 4 Sheets-Sheet 3

INVENTOR
W. H. T. HOLDEN
BY
[signature]
ATTORNEY

March 20, 1956 W. H. T. HOLDEN 2,739,187
STATION NUMBER IDENTIFIER
Filed Jan. 6, 1953 4 Sheets-Sheet 4

INVENTOR
W. H. T. HOLDEN
BY
ATTORNEY

United States Patent Office 2,739,187

Patented Mar. 20, 1956

2,739,187

STATION NUMBER IDENTIFIER

William H. T. Holden, Pasadena, Calif., assignor to Bell Telephone Laboratories, Incorporated, New York, N. Y., a corporation of New York Application January 6, 1953, Serial No. 329,912

7 Claims. (Cl. 179—18)

This invention pertains to telephone systems which are provided with means for identifying calling station directory numbers, and pertains especially to improvements over the system for identifying such numbers which is disclosed in Patent No. 2,484,612 issued on October 11, 1949 to Joseph W. Dehn and William H. T. Holden.

Calling line identifying devices are necessary whenever items of information pertaining to telephone calls, and including the identity of the stations from which such calls are placed, are to be automatically recorded. For this purpose it is often desirable in the first instance to identify the calling stations by their directory numbers rather than by their terminal numbers, in order to avoid thereby subsequent additional operations to obtain, for billing purposes, the former numbers from the latter. Identification of lines (or stations) by their directory numbers presents difficulties, particularly in telephone systems of the cross-bar type, for example, where the relation between the numbers indicating the terminating locations of the lines in the office (terminal numbers) and the directory numbers of the stations located on the line terminals is purely arbitrary.

The present invention discloses an economical and simple arrangement for obtaining the directory numbers of calling stations directly and rapidly. While particularly valuable for use with cross-bar telephone systems, it is not limited in use to such systems, nor to the purposes of automatic message recording, but is applicable to any type of telephone system and for any purpose for which the determination of the directory numbers of lines or stations is desirable.

A feature of this invention is a station number identifier that uses electronic devices which are inexpensive, readily replaceable and not subject to rapid deterioration.

Another feature of the invention is the use of a unidirectional pulse of extremely short duration to effect the operation of devices which identify the number of the calling station, with consequent economics in time and equipment. The pulse may be of extremely short duration since the indicating devices responsive to the pulse are affected by the rate of change of the pulse as it increases from zero to its maximum value as well as by the specific magnitude of the pulse.

Another feature of the invention is an arrangement whereby a number of identifiers may be severally connected to different stations to identify the respective directory numbers of acid stations without said identifier interfering with one another.

One feature of the identifier which constitutes a part of the present invention is its ability to identify one or the other of two directory numbers associated, respectively, with one and the other of two stations on a party line, without the need of a "number field" for the stations on the "tip" conductors of the lines and a similar "number field" for the stations on the "ring" conductors.

A more specific feature of the identifier constituting a part of the present invention is the use of two "time slots" (time-spaced impulses) for identifying individual and two-party stations, the one "time slot" being used to identify individual stations and "ring" stations of two-party lines, and the other "time slot" being used to identify "tip" stations on such two-party lines.

Still another feature of the invention is the adaptation of equipment to serve a large number of subscribers' lines, not only in one central office but, if desired, in a plurality of such offices.

These and other features of the invention will be the more readily understood from the following description, appended claims, and the drawing in which:

Figures 1, 6:
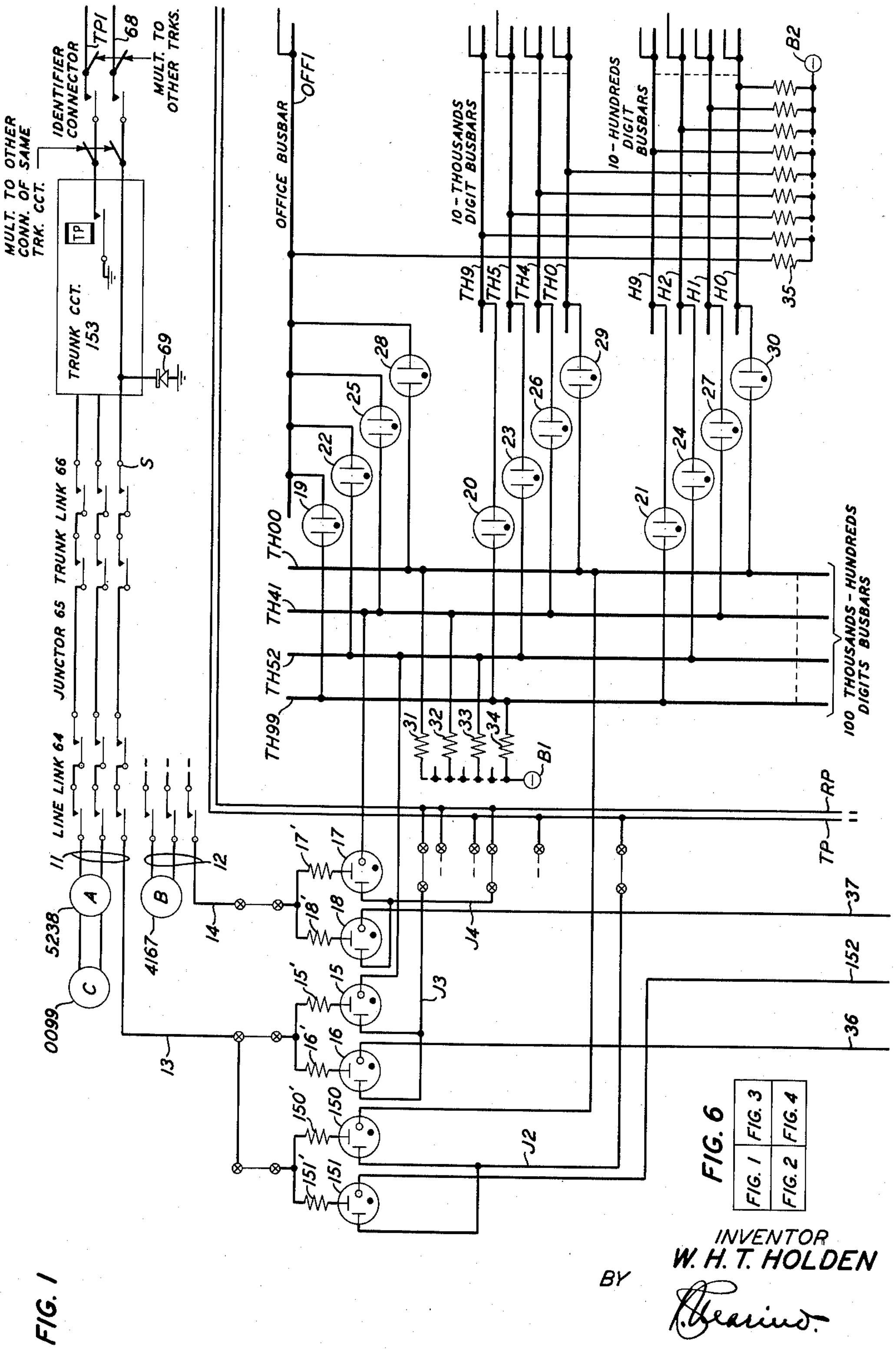
Fig. 1 shows two subscribers' lines, a two-party line and an individual line, the extension of said two-party line by switching means including a portion of the outgoing trunk, and a portion of the common circuit networks provided for identifying the directory numbers of the stations on said lines and on other lines.
Fig. 6 shows how the above figures (except Fig. 5) should be placed with relation to one another to disclose the invention.

I will first describe the arrangement of the common circuit networks provided for identifying calling station numbers, from which description the general mode of operating the invention will be apparent. For purposes of illustration, two subscribers' lines 11 and 12 are shown in Fig. 1; line 11 being a two-party line with "ring" station A thereon having the directory number 5238, and a "tip" station C having directory number 0099, while line 12 is an individual line with station B thereon having directory number 4167. As is well known, the station on an individual line is treated, electrically speaking, like the ring station of a two-party line, in that the party identification test for a calling ring station on a two-party line is the same as for a calling single station on an individual line. It is assumed that both of the above-mentioned lines are in the same central office.

In accordance with the present invention, the sleeve conductor of each line having one or two stations thereon, each having a directory number to be identified when the station calls, is connected to one element of each of two or four gas discharge, three-element, cold cathode tubes; there being one pair of such tubes provided for each of the stations on the line. For example, the sleeve conductor 13 of line 11 is connected through resistors 15' and 16' to the starter anode of each of the tubes 15 and 16, respectively, provided for the ring station A; and through resistors 151' and 150' to the starter anode of each of the tubes 151 and 150, respectively, provided for the tip station C. On the other hand, the sleeve conductor 14 of line 12 is connected through resistors 17' and 18' to the starter anode of each of tubes 17 and 18, respectively, provided for the single station B on the line 12. The main anodes of the two tubes constituting each pair of tubes are connected together and extended to conductor RP or TP depending upon whether the station with which the pair of tubes is associated is a "ring" or a "tip" station, respectively. Thus, the main anodes of tubes 17 and 18 associated with the single station B on line 12 are connected together, and by means of conductor J4, are connected to conductor RP. This is also true of the main anodes of the two tubes 15 and 16 which, by means of conductor J3 are connected to conductor RP, since the station A on line 11 with which said tubes are associated is a "ring" station. On the other hand, the main anodes of the tubes 150 and 151, associated with the tip station C on line 11, are connected by means of conductor J2 to conductor TP. This manner of connecting the main anodes of the two pairs of tubes assigned to each station in the exchange is followed for all stations; that is, the main anodes of tube pairs associated with the individual stations and "ring" party stations are connected to conductor RP, while the main anodes of tube pairs associated with "tip" party stations are connected to conductor TP. It should be noted that conductors TP and RP extend, in part, to the outer terminals of the secondaries of transformer 60 which is supplied with a full wave alternating potential from source 59, thus to produce a positive pulse on each half of a full wave for application, respectively, to conductors RP and TP.

The cathode of one of the tubes of the pair associated with each of the stations on the several lines is connected to one of 100 common conductors or bus-bars, in accordance with the thousands and hundreds digit combination of the directory number of each of said stations. For example, bus-bars TH00, TH41, TH52 and TH99 are four of the 100 thousands-hundreds digits bus-bars TH00 . . . TH99 provided for office No. 1 in which lines 11 and 12 are assumed to be located, and are the bus-bars assigned to the thousands and hundreds digit combinations 00, 41, 52, and 99, respectively, of the total of 10,000 directory numbers. Accordingly, the cathode of tube 15, associated with ring station A on line 11, and having the directory number 5238, is connected to bus-bar TH52, to which are also connected cathodes of tubes associated with other stations on other lines (not shown) in the same central office having directory numbers the thousands digit of each of which is 5 and the hundreds digit is 2. In a similar manner, the cathode of tube 150, associated with the tip station C on line 11, and having the directory number 0099, is connected to bus-bar TH00, to which are also connected with the cathodes of tubes associated with other stations on other lines (not shown) in the same central office and having directory numbers the thousands digit of each of which is 0 and the hundreds digit is 0.

Likewise, the cathode of tube 17, associated with line 12 the directory number of whose individual station B is 4167, is connected to bus-bar TH41, to which are also connected the cathodes of tubes associated with other stations on other lines (not shown) in the same central office and having directory numbers the thousands digit of each of which is 4 and the hundreds digit is 1.

To each of the 100 thousands-hundreds digits bus-bars TH00 . . . TH99 is connected one element of each of three gas discharge cold cathode diode tubes. For example, one element of each of tubes 19, 20 and 21 is connected to bus-bar TH99, one element of each of tubes 22, 23, and 24 is connected to bus-bar TH52, one element of each of tubes 25, 26, and 27 is connected to bus-bar TH41, and one element of each of tubes 28, 29 and 30 is connected to bus-bar TH00. The other element of one of the tubes connected to each thousands-hundreds digits bus-bar is connected to a bus-bar which is individual to the central office served by said 100 thousands-hundreds digits bus-bar. For example, one element of each tube 19, 22, 25, and 28 is connected to the bus-bar OFF1, which is individual to office No. 1.

The other element of the second of the tubes associated with each of the 100 thousands-hundreds digits bus-bar TH00 . . . TH99 is connected to one of 10 thousands digit bus-bars TH0 . . . TH9 in accordance with the thousands digit of the thousands-hundreds digit combination of directory numbers, while the other element of the third tube associated with each of the 100 thousands-hundreds digits bus-bars is connected to one of 10 hundreds digit bus bars H0 . . . H9 in accordance with the hundreds digit of the thousands-hundreds digit combination of directory numbers. For example, tube 23, one of whose elements is connected to bus-bar TH52 assigned to the digit combination 52, has its other element connected to the thousands digit bus-bar TH5, to which are also connected corresponding elements of tubes associated with others of the 100 thousands-hundreds digits bus-bars (not shown) assigned to thousands-hundreds digit combinations the first digit of each of which is 5. Likewise, tube 24, one of whose elements is connected to bus-bar TH52, has its other element connected to the hundreds digit bus-bar H2, to which are also connected corresponding elements of tubes associated with others of the 100 thousands-hundreds digits bus-bars (not shown) assigned a thousands-hundreds digit combinations the second digit of each of which is 2.

The 100 thousands-hundreds digits bus-bars TH00 . . . TH99 are each supplied with negative potential from negative battery B1 through, for example, resistor 31 connected to bus-bar TH00, resistor 32 connected to bus-bar TH41, resistor 33 connected to bus-bar TH52 and resistor 34 connected to bus-bar TH99. Each of the office OFF–, thousands digit TH– and hundreds digit H– bus-bars is supplied with a higher negative potential from negative battery B2 through resistor 35, for example, connected to bus-bar OFF1, it being understood that there is one such resistor connected to each of the several mentioned bus-bars and to battery B2. The difference of potential between batteries B1 and B2 is slightly lower than that which is necessary to maintain conduction in each tube, such as tube 19, for example. None of the gas discharge diode tubes connected to the bus-bars, therefore, normally conducts, but will conduct if the difference of potential between their elements is slightly increased.

Figure 3:
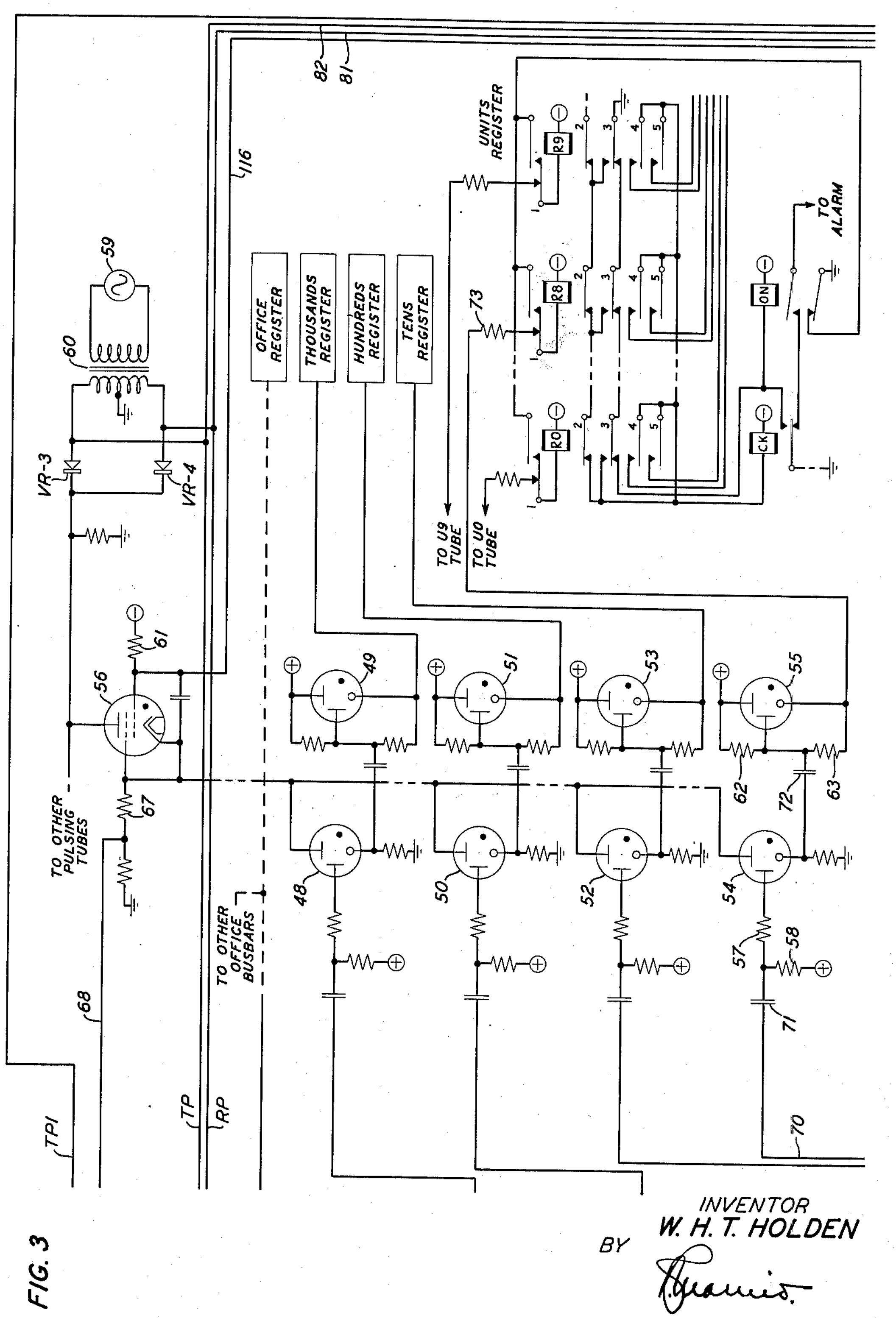
Fig. 3 shows the circuit of an identifier.

Owing to the arrangement of gas discharge tubes between the sleeve conductors of lines and the thousands-hundreds digits bus-bars TH00 . . . TH99, and between the latter bus-bars, the 10 thousands digit bus-bars TH0 . . . TH9, and 10 hundreds digit bus-bars H0 . . . H9, it should be evident that if a potential is applied to the sleeve conductor of any line, conductor 14 of line 12, for example, which is sufficient to cause the starter anodes of the gas discharge tubes connected thereto, in this instance tubes 17 and 18 to conduct, the main anode supply to said tubes from bus-bar RP will impress positive pulses of a half cycle duration on bus-bar TH41 (and also on bus-bar TU67), and the voltage resulting therefrom will be transmitted through tubes 25, 26 and 27 to the bus-bars OFF1, TH4 and H1, respectively. This, however, will occur only if the pulses received over the sleeve conductor 14 from the identifier circuit in Fig. 3 are in the "ring" party phase; that is to say, coincident in time with the occurrence of the positive pulse of a half cycle duration applied to conductor RP, as will be explained. On the other hand, if two pairs of tubes are connected to the sleeve conductor, as is the case for example with tubes 15, 16 and 150, 151 connected to sleeve conductor 13 of line 11, and the main anodes of one pair of tubes are connected to bus-bar TP, as they are for the tubes 150 and 151, said latter tubes will not conduct at the time that tubes 16 and 15 are caused to conduct by the pulse transmitted over the conductor RP, since the starter gap breakdown in tubes 150 and 151 would occur at a time when their main anodes are negative since the pulse applied to conductor TP is negative when the one applied to conductor RP is positive, and vice versa. If suitable indicating means are provided, the presence of potential on bus-bars OFF1, TH4, and H1 when tubes 25, 26, and 27 are rendered conducting, will indicate that the station B on line 12, to the sleeve conductor 14 of which potential was applied, is in office No. 1, that the thousands digit of said station's directory number is 4, and that the hundreds digit is 1.

It is also evident that a set of 100 thousands-hundreds digits bus-bars TH00 . . . TH99 and an office bus-bar, such as bus-bar OFF1, may be provided for each central office, since these bus-bars are used to indicate the central office in which the line being identified is located. The 10 thousands digit bus-bars TH0 . . . TH9 and the 10 hundreds digit bus-bars H0 . . . H9, however, may be used to serve the lines of any number of central offices, since these bus-bars are used only to indicate digits of directory numbers.

A similar arrangement as above of bus-bars and gas discharge tubes is used for producing an indication of the tens and units digits of directory numbers. The cathode of the second of the above-mentioned gas discharge triode tubes associated with the sleeve conductor of each line for a subscriber's station thereon is connected to one of 100 tens-units digits bus-bars TU0 . . . TU99, of which bus-bars TU00, TU38, TU67 and TU99 are four, in accordance with the tens-units digits combination of the directory number of said station. For example, the cathode of tube 16 associated with line 11 and ring station A thereon having the directory number 5238, is connected over conductor 36 to bus-bar TU38, to which are also severally connected the cathodes of tubes (not shown) associated with other stations, the directory numbers of which comprise the tens-units digit combination 38. The cathode of tube 151 of the pair of tubes 151 and 150 also associated with line 11 but with the tip station C thereon having the directory number 0099, is connected over conductor 152 to bus-bar TU99, to which are also severally connected the cathodes of tubes (not shown) associated with other stations the directory numbers of which comprise the tens-units combination 99. In a similar manner, the cathode of tube 18, associated with line 12 and the individual station B thereon having the directory number 4167, is connected over conductor 37 to bus-bar TU67, to which are also severally connected the cathodes of tubes (not shown) associated with other stations, the directory numbers of which comprise the tens-units digit combination 67.

To each of the 100 tens-units digits bus-bars TU00 . . . TU99 is connected one element of each of two gas discharge cold cathode diode tubes. For example, one element of each of tubes 38 and 39 is connected to bus-bar TU99, one element of each of tubes 40 and 41 is connected to bus-bar TU67, one element of each of tubes 42 and 43 is connected to bus-bar TU38, and one element of each of tubes 44 and 45 is connected to bus-bar TU00. The other element of one of the tubes associated with each tens-units digits bus-bars TU00 . . . TU99 is connected to one of 10 tens digit bus-bars T0 . . . T9 in accordance with the tens digit of the tens-units digits combination of the involved station directory number, and the other element of the second tube associated with each tens-units digits bus-bar is connected to one of 10 units digit bus-bars U0 . . . U9 in accordance with the units digit of said combination. For example, tube 40 having one of its elements connected to bus-bar TU67 for the tens-unit digit combination 67, has its other element connected to bus-bar T6, to which are also connected corresponding elements of tubes (not shown) associated with the other of the 100 tens-units digits bus-bars TU00 . . . TU99 assigned to digit combinations each of whose tens digit is 6. Likewise, an element of tube 41, also associated with bus-bar TU67 and assigned to the same tens-units digit combination 67, is connected to said bus-bar TU67, while its other element is connected to units bus-bar U7 to which are also connected corresponding elements of tubes (not shown) associated with others of the 100 tens-units digits bus-bars TU00 . . . TU99 assigned to tens-digit combinations each of whose units digit is 7.

Each bus-bar is supplied with suitable potential, the 100 tens-units digits bus-bars TU00 . . . TU99 each being supplied with negative potential from battery B3 through resistors, such as resistor 46 for bus-bar TU67, and the tens digit and units digit bus-bars T0 . . . T9 and U0 . . . U9, respectively, with higher negative potential from battery B4 through resistors such as resistor 47 for bus-bar U0, such that the gas discharge diode tubes severally connected between the 100 tens-units bus-bars TU00 . . . TU99 and the 10 tens bus-bars T0 . . . T9 and the 10 units bus-bars U0 . . . U9 do not normally conduct, but will conduct if the potential difference between their elements is slightly increased.

It is evident that if a potential is applied to the sleeve conductor of any line sufficient to cause the starter anodes of the gas discharge tubes connected thereto to conduct, and if such starter anode conduction occurs when the main anodes of said tubes have a positive pulse applied thereto over conductor TP or RP according to which of said conductors said main anodes are connected, conduction will spread through the main gaps of the tubes, causing potential to be present on the bus-bars to which the cathodes of said tubes are severally connected. The presence of potential on the bus-bars associated with the tube having its cathode connected to the bus-bar in the tens-units group of bus-bars TU00 . . . TU99 which indicates the tens-units combination of the directory number, will indicate the tens and units digits of the directory number of the calling station on said line. For example, if potential is applied to sleeve conductor 14 of line 12, causing tubes 18 and 17 to conduct when a positive pulse is applied to conductor RP, potential will be present on bus-bar TU67, thence to tubes 40 and 41, causing said tubes to conduct, and through said latter tubes to bus-bars T6 and U7, indicating by the electrical activation of said latter two bars that the tens and units digits of the directory number of the station on line 12 are 6 and 7, respectively.

It is also evident that the 100 tens-units digits bus-bars TU00 . . . TU99, the 10 tens digit bus-bars T0 . . . T9, and the 10 units digit bus-bars U0 . . . U9 may be used to serve any number of lines located in any number of central offices, since said bus-bars are employed to indicate digits of directory numbers of lines irrespective of the central offices in which said lines are located.

By the use of additional bus-bars and additional gas discharge tubes connected in the manner described, the system may be extended to provide means for indicating directory numbers of more than four digits, or other information in regard to a line or station to be identified, such as, for example, the class of the line or its rate zone.

Figures 2, 5:
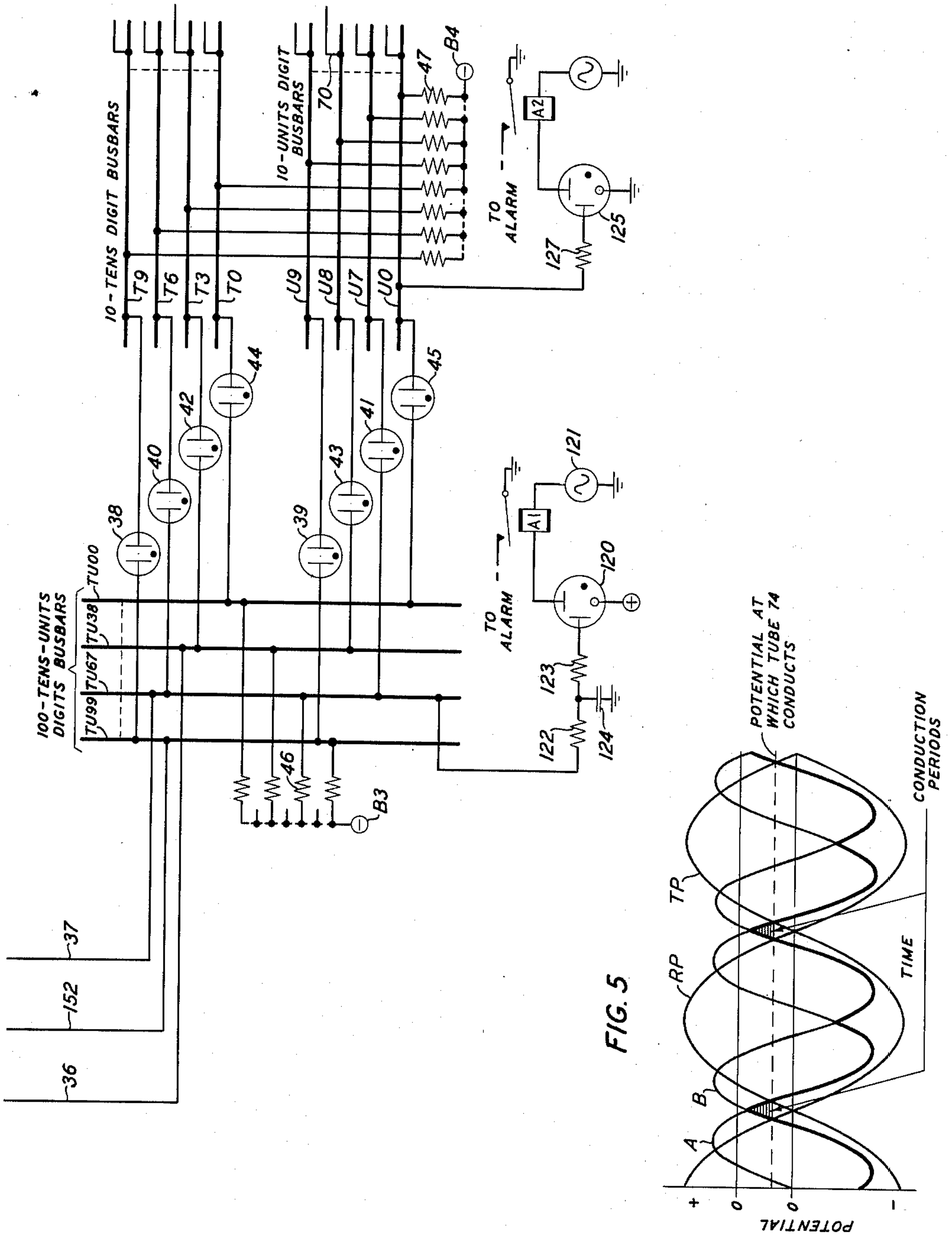
Fig. 2 shows another portion of the common circuit networks.
Fig. 5 is a graphical representation of the potentials supplied to the pulse generating tube 74 shown in Fig. 4.

For utilizing the means provided by the common circuit network shown in Figs. 1 and 2 for identifying the directory number of a calling station, an identifier circuit shown in Fig. 3 is employed. This identifier comprises an indicating tube and an associated registering tube connected through a condenser to each of the office OF-thousands digits TH0 . . . TH9, hundreds digits H0 . . . H9, tens digits T0 . . . T9, and units digits U0 . . . U9 bus-bars, a pulsing tube 56, and suitable registers for the office digit and for each of the four digits of the directory number. For example, tube 48 is an indicating tube and tube 49 is a registering tube, both associated with thousands digit bus-bar TH5; tube 50 is an indicating tube and tube 51 is a registering tube, both associated with hundreds digit bus-bar H2; tube 52 is an indicating tube and tube 53 is a registering tube, both associated with tens digit bus-bar T3, while tube 54 is an indicating tube and tube 55 is a registering tube, both associated with units digit bus-bar U8. The indicating and registering tubes for an office bus-bar are not shown. Tube 56 is, as said before, the pulsing tube of the identifier, and has one of its control grids and cathode connected as shown to the main anode of each of the indicating tubes associated with each of the digital bus-bars OF-, TH0 . . . TH9; H0 . . . H9; T0 . . . T9; and U0 . . . U9.

In the present embodiment of the invention, the indicating tubes and the registering tubes are gas discharge triode tubes of the cold cathode type, while the pulsing tube 56 is a gas discharge tetrode tube of the heated cathode type. The registers may be of any suitable type and may each be similar to the register for the units digits, comprising the ten relays R0 . . . R9, and relays CK and ON as shown in Fig. 3.

The control anode of each of the indicating tubes, for example tube 54, is supplied with positive potential by positive battery through resistors 57 and 58, and this potential is of such value that said tube will not normally conduct even when its main anode is also supplied with positive potential, but will conduct if, at the same time, the potential of its control anode is slightly raised. The main anodes of all the indicating tubes of an identifier, such as tubes 48, 50, 52 and 54, for example, are connected, as said before, to the cathode and control grid of the associated pulsing tube 56, the anode of which is supplied with rectified but unfiltered full wave alternating potential from the source 59 through transformer 60 and rectifiers VR–3 and VR–4. The other control grid of said tube is biased by negative battery through resistor 61, so that said tube does not normally conduct, but will conduct if the potential of said other control grid is made slightly less negative, say by a positive pulse over conductor 116. The main anode of each of the registering tubes, for example, tube 55, is supplied with positive potential as shown, and the control anode is biased by potential from the voltage divider composed of resistors 62 and 63, so that said tube does not normally conduct, but will conduct if its control anode is made slightly more positive.

To identify the directory number of a station on a calling line, for example the ring station A on line 11, and having the directory number 5238, said line is extended in the manner common to cross-bar systems by the line link 64, the junctor 65 and trunk link 66 to the trunk 153. This trunk may be of any suitable kind that is equipped with a "party test" circuit including the relay TP by which, when appropriate, said relay is bridged across the line extension to determine whether, on a two-party line, the tip station or the ring station has initiated the call. If it is the tip station, for example station C, relay TP operates, but if it is the ring station, for example station A, or an individual station, for example station B of line 12, relay TP remains normal. Patent No. 1,513,351, granted October 28, 1924 to D. M. Taggart et al. shows one suitable embodiment of this party test circuit, the relay 249 therein corresponding to relay TC of the present application, reference is made to this patent for a complete disclosure and description of the manner in which said circuit operates.

The trunk 153 is connected to the identifier of Fig. 3 by means of the usual identifier connector mechanism (not shown but indicated in Fig. 1) which, of course, has access to other trunks as well, only the conductors TP1 and 68 of the trunk indicated in Fig. 1 being shown as extended to the identifier, since these conductors are the only trunk conductors involved in the operation of the present invention. It is evident that when by the operation of the identifier connector the identifier shown in Fig. 3 is connected to the trunk 153, the operation of relay TP in response to the party test, and indicating that the call was initiated by the tip station C, will ground conductor TP1 and thereby complete the circuit of relay TP—A, causing said relay to operate. If the call was initiated by the ring station A, or by an individual station if the connection was from an individual station, relay TP would remain normal as a result of the party test, and relay TP—A would not be operated. It should be noted that relay TP—A is individual to the identifier shown in Fig. 3, relays TP—B, TB—C and TB—D shown in Fig. 4, each being individual to another identifier.

The cathode of the pulsing tube 56 of the identifier shown in Fig. 3 is connected through resistor 67 and conductor 68 to sleeve conductor 13 of the line 11. By suitable means such as that hereinafter described, the control grid of tube 56 is made momentarily sufficiently less negative to cause said tube to conduct during the one-half of one cycle of alternating current.

The sleeve conductor of a subscriber's line, for example conductor 13, is used in automatic telephone systems for other purposes, chief among which is the holding of the magnets of the various switches by which the line is extended. Rectifier 69 furnished in the trunk, provides a path to ground for the negative potential by which said magnets are held, but opposes the passage of positive potential. The positive pulse from the cathode of tube 56, when it occurs, will not, therefore, pass through rectifier 69 but will be transmitted to sleeve conductor 13 as extended to conductor 68, and to tubes 15, 16 and 150, 151 causing either pair of said tubes to be rendered conducting depending upon which pair has the positive phase of the potential supplied to the anodes thereof over conductor TP or RP which coincides with the positive pulse transmitted over the sleeve conductor 13. If it is assumed, for example, that the ring station A has initiated the call, then it will be shown that when the positive pulse is transmitted over the sleeve conductor 13, a coincident phase of potential appears on conductor RP, causing tubes 15 and 16 to be rendered conducting, thence by the conduction of tube 15 to bus-bar TH52 and by the conduction of tube 16 to bus-bar TU38. The pulse of positive potential on bus-bar TH52 will cause tubes 22, 23, and 24 to conduct. By the conduction of tube 22 the pulse will be transmitted to bus-bar OFF1; by the conduction of tube 23 it will be transmitted to bus-bar TH5, and by the conduction of tube 24 it will be transmitted to bus-bar H2. Likewise, the positive pulse on bus-bar TU38 will cause tubes 42 and 43 to conduct. By the conduction of tube 42 said positive pulse will be transmitted to bus-bar T3, and by the conduction of tube 43 it will be transmitted to bus-bar U8.

The positive pulse on bus-bar U8, for example, will be transmitted over conductor 70, and will produce a pulse through condenser 71 the magnitude of which will depend upon the rate of change in potential of the pulse as applied to said condenser. The pulse from condenser 71 is then transmitted through resistor 57 to the control anode of tube 54, causing said tube to conduct momentarily since, at the same time a pulse of positive potential is received on the main anode of said tube from the cathode of tube 56, the same pulse is simultaneously transmitted to the main anodes of the indicating tubes, including tubes 48, 50, 52 and 54. The rise of potential at the cathode of tube 54 due to the conduction of said tube 56 will be transmitted through condenser 72 to the control anode of tube 55, causing said tube 55 to conduct over a circuit extending from positive battery, through the anode-cathode space thereof, resistance 73, No. 1 normal contact of relay R8, and the winding of said relay, to negative battery.

In like manner, the positive pulse on bus-bars OFF1, TH5, H2, and T3 will each cause conduction of a tube (not shown) similar to register tube 55 which is associated with bus-bar OFF1, and of tubes 49, 51 and 53. Conduction of said tube (not shown) associated with bus-bar OFF1 indicates that line 11 is in office No. 1, while conduction of tubes 49, 51, 53, and 55 indicate that the four digits of the directory number of station *a* on line 11 are 5, 2, 3, and 8.

The indication given by the conduction of each of the registering tubes, for example tube 55, may be registered by any suitable means, for example, the relay circuit such as shown in Fig. 3 for registering the units digit indication. Only three register relays R0, R8 and R9 of said circuit are shown, but it will be understood that the circuit comprises ten such relays R0 . . . R9, each connected to a corresponding register tube in the manner shown for relay R8 and tube 55.

The current which normally flows from positive battery through resistors 62, 63 and 73, No. 1 normal contacts of relay R8, and the winding of said relay to negative battery, is not sufficient to operate relay R8. However, when tube 55 conducts, as described above, the decreased resistance in the circuit causes additional current to flow, operating relay R8, which locks up through its No. 1 front contact and No. 2 contacts of normally operated relay ON. The operation of relay R8 opens at the No. 1 normal contact the circuit of tube 55, causing said tube to cease to conduct and, at the No. 3 back contact of said relay, opens the normal operating circuit of relay ON, which circuit extends from battery through the winding of relay ON, and No. 3 back contacts of relays R0 to R9, inclusive (relays R0, R8, and R9 only being shown) to ground. However, relay CK now operates over a circuit extending from battery through the winding of said relay No. 2 contacts of relays R0 to R9 (relay R0 only being shown), No. 3 front contact of relay R8 and No. 3 back contact of relay R9, to ground, providing an obvious additional circuit through its contacts for relay ON which prevents the release thereof.

If, through some fault in the circuits, more than one of the register relays R0 to R9, for example, are operated at the same time, the circuit of relay CK will not be completed. Relay CK will, therefore, not operate, and relay ON will release. A circuit will then be completed from ground through back contact of relay CK and No. 1 contacts of relay ON to an alarm (not shown) actuating said alarm.

A plurality of identifiers of the type shown in Fig. 3 and described above may be associated with the bus-bars shown in Figs. 1 and 2. If the respective pulsing tubes 56 of these identifiers are actuated repeatedly and in succession (as will be shown), no two pulsing tubes being actuated at the same moment, then any or all of said identifiers may be connected at the same time to calling lines for identification of the directory numbers of their respective calling stations, and each identifier will identify the station on the line to which it is connected.

For example, assume two identifiers to be associated with the units digit bus-bars U0 . . . U9. To each of these bus-bars will be connected two indicating tubes similar to tube 54 and in the manner shown for tube 54. The main anode of one of said tubes associated with each bus-bar will be connected to the cathode of a pulsing tube 56 of a first identifier, while the main anode of the other of said tubes associated with each bus-bar will be connected to the cathode of a pulsing tube 56 associated with the second identifier. If the cathode of the pulsing tube 56 of the first identifier be connected to the extended sleeve conductor of a line having a directory number the units digit of which is 6, and the cathode of the pulsing tube 56 of the second identifier be connected to the extended sleeve conductor of a line having a directory number the units digit of which is 7, and the two pulsing tubes 56 are rendered momentarily conductive in succession, a positive pulse will appear on bus-bar U6 when the pulsing tube 56 of the first identifier is rendered conducting and will reach both indicating tubes connected to said bus-bar U6, while a positive pulse will appear on bus-bar U7 when, later, the pulsing tube 56 of the second identifier is rendered conducting and will reach both indicating tubes connected to said bus-bar U7. But the first-mentioned positive pulse will affect only the first of the two indicating tubes connected to bus-bar U6, since the main anode of said tube is, at the moment, supplied with potential from the cathode of the pulsing tube 56 of the first identifier, while the main anode of the second indicating tube is not supplied with potential. Likewise, the second-mentioned positive pulse will affect only the second of the two indicating tubes connected to bus-bar U7, since the main anode of said tube is, at the moment, supplied with potential from the cathode of the pulsing tube 56 of the second identifier, while the main anode of the first indicating tube is not supplied with potential. In like manner, other indicating tubes, and consequently the associated registering tubes, are affected by pulses produced by the associated pulsing tube 56, but are unaffected by pulses produced by the pulsing tubes of other identifiers.

A circuit arrangement for actuating four identifiers, for example, in rapid succession for the purpose described above is shown in Fig. 4. It includes a pulse generating tube 74 and a circuit of the type known as a thyratron ring, comprising tubes 75A, 75B, 76A, 76B, 77A, 77B, 78A and 78B. This circuit is arranged for actuating four identifiers but, by extension of the thyratron ring, may be adapted to the actuation of any number of identifiers.

One secondary winding of transformer 80 is supplied with double frequency alternating current from the supply source 59 over conductors 81, 82 by a frequency doubler circuit FD of the well-known type, said source 59 also supplying, of course, anode potential to pulsing tube 56 and to identical pulsing tubes 56 (not shown) of the three other identifiers to be actuated. Alternating potential from the other secondary winding of transformer 80 is biased by negative potential from the voltage divider composed of resistors 83 and 84, and supplied to the network composed of resistor 85 and condenser 86. The values of said resistor and condenser are so chosen that the potentials at rectifiers 87 and 88 have a phase difference of nearly, but not exactly, 180 degrees.

Curves A and B in Fig. 5 show graphically the relative potentials applied to rectifiers 87 and 88, respectively. Said rectifiers are so poled that they oppose transmission of positive potentials. The resultant potential transmitted through rectifiers 87 and 88 and thence through resistor 89 to the control grid of tube 74, which, in the present embodiment of the invention is a gas discharge triode tube of the heated cathode type, is shown by the heavy line curve of Fig. 5. It will be observed that said control grid is maintained sufficiently negative to prevent conduction in tube 74, except during a short period in each cycle when its potential approaches zero sufficiently to permit tube 74 to conduct. The anode of tube 74 is supplied with operating potential through the self-clearing anode circuit comprising resistor 90 and condenser 91, the values of which are so chosen in relation to the value of the anode potential and the characteristics of tube 74 that the discharge of condenser 91, due to the drop of potential through resistor 90 when tube 74 conducts, maintains conduction until the control grid of tube 74 again goes negative, when the potential between the anode and the cathode of said tube is insufficient, due to the potential drop in resistance 90, to maintain conduction.

Tube 74, therefore, conducts for a very short period in each cycle of alternating current, producing at its cathode short positive pulses which are transmitted through resistor 92, thence through condensers 93A, 93B, 94A, 94B, 95A, 95B, 96A, 96B, and resistors 97A, 97B, 98A, 98B, 99A, 99B, 100A and 100B to the control anodes of the gas discharge cold cathode triode tubes 75B . . . 75A (reading to the right consecutively from tube 75B to and including 75A). The control anodes of said tubes are each negatively biased. For example, the control anode of tube 75B is biased by negative battery through resistors 101, 102, and 97A. The amplitude of the pulses from the cathode of tube 74 is limited by rectifier 103 to a value insufficient in itself to overcome said negative bias and cause tubes 75A . . . 78B to conduct. However, upon the closure of switch 104 to apply anode potential to said tubes 75A . . . 78B the sudden rise of potential at the main anode of tube 75A is transmitted through condenser 105 to the control anode of said tube, the current path being completed through resistors 100B, 156, and 155, to negative battery.

The conductivity of tube 75A raises the potential of its cathode, and the rise in said potential is made available as a positive pulse at the back contact of relay TP—A if this relay is normal at the time; that is, if the calling station is an individual or ring party station as before described. If relay TP—A is normal, the positive pulse becomes effective at this time over conductor 116 to overcome the bias at the control cathode of tube 56 effected by negative battery through resistor 61 which, as said before, keeps said tube 56, inactive. The application of the pulse renders the control grid positive, thereby causing said tube to become conductive, thereby to cause a positive pulse to be applied to the anodes of the indicating tubes and a positive pulse to conductor 68 (or sleeve conductor S of the line) and thence to conductor 13 of the line of the calling station. It should be noted at this time that conductors 81 and 82 are so wired to the primary winding of transformer TR–2 that when, for example, conductor 81 is positive and conductor RP accordingly becomes positive, the pulse from tube 74 in consequence thereof is the pulse which renders tube 75A conducting and the latter effective in rendering tube 56 conducting. Fig. 5 shows the phase relationship between the sixty-cycle potentials on conductors RP and TP, and the impulses which advance the counting chain in Fig. 4, this relation being assured by the suitable design of the frequency doubler circuit FD shown in said figure. The consequence is that if relay TP—A is normal when tube 75A is activated the line tubes 15 and 16 associated with the calling station A on said line will be rendered conducting since at the time that the positive pulse is being supplied to conductor 13 of said line by the conductivity of tube 56, a coincident positive pulse is being supplied to conductor RP and to conductor 81 from the lower secondary winding of transformer 60. The indication of the directory number will then take place as already described.

It is apparent that if at the time tube 75A has been rendered conducting relay TP—A is operated, owing to the fact that the call is initiated by the "tip" party A, then no pulse would be applied to conductor 116 and pulsing tube 56 would remain quenched.

Said pulsing tube 56 would then be operated upon the operation of tube 75B, the next tube in the thyratron chain, the operation of which is brought about as follows:

A part of the resultant rise in potential at the cathode of tube 75A, the amount being determined by the voltage divider composed of resistors 101 and 110 is transmitted through the network composed of resistors 102 and 97A and condenser 111, and with a time delay due to the characteristics of said network, to the control anode of tube 75B, raising the potential of said control anode so that the additional potential of the next positive pulse from the cathode of tube 74 will be sufficient to cause tube 75B to conduct. The resultant rise in potential at the cathode of tube 75B is available at the front contact of relay TP—A. Should this relay be operated in consequence of the fact that the call was initiated by the tip station C, then the pulse is transmitted over conductor 116 to cause the operation of tube 56 at the time when a positive pulse is being concurrently applied to conductor TP from the upper secondary winding of transformer 60, thereby to cause tubes 150 and 151 associated with station C to operate, with the results already noted.

Figure 4:
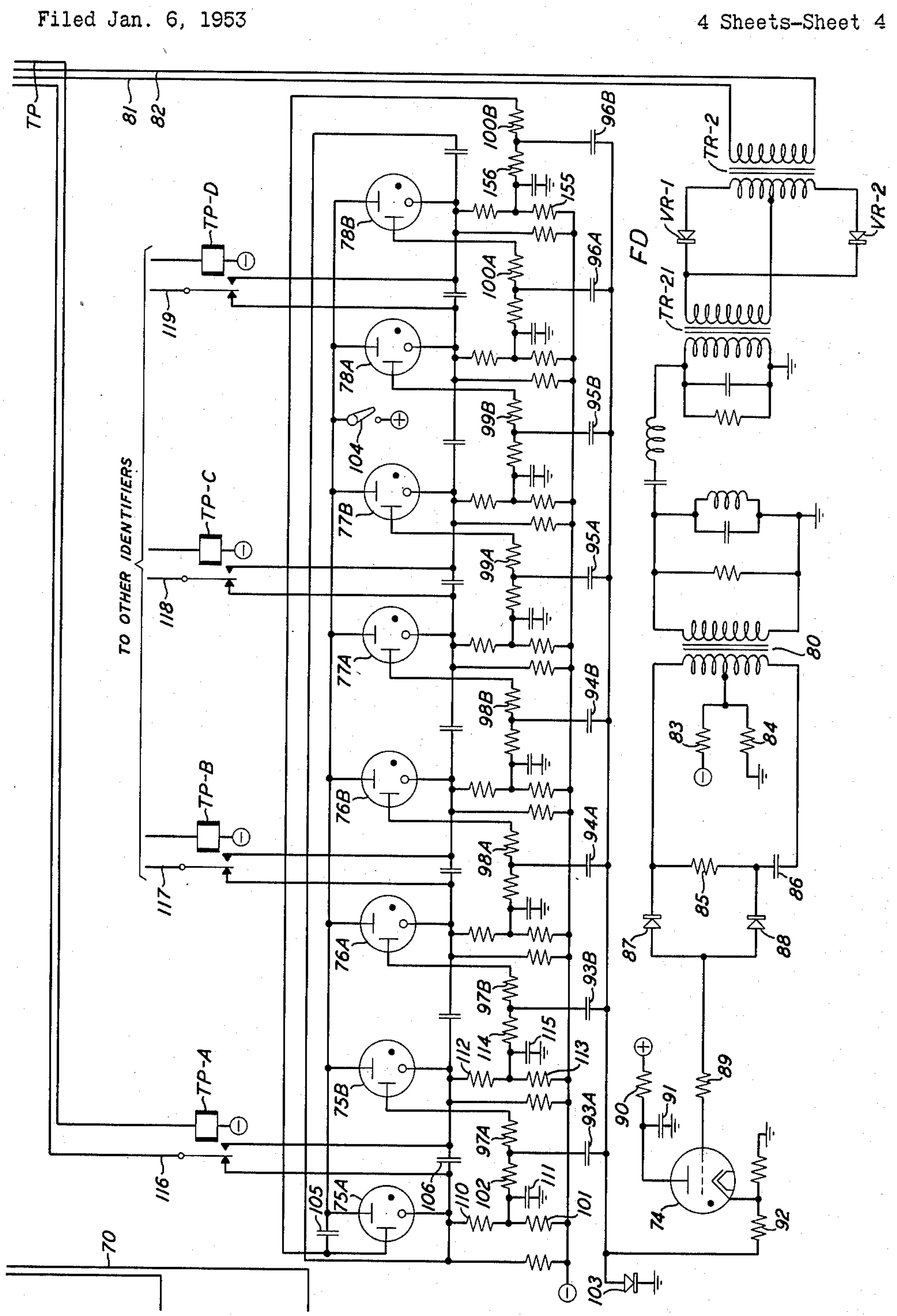
Fig. 4 shows the circuit for actuating a plurality of identifiers.

Thus the circuit of Fig. 4 provides two time-spaced impulses ("time slots") for each identifier with which to enable it to identify a particular number, using the first impulse to identify such a number if it is that of an individual or ring party station, and the second (and later) impulse if said number is that of a tip party station.

The resultant sudden rise of potential at the cathode of tube 75B is transmitted through condenser 106 to the cathode of tube 75A, raising the potential of the cathode of tube 75A to a point where said tube ceases to conduct. A part of said rise of potential at the cathode of tube 75B, the amount being determined by the voltage divider composed of resistors 112 and 113, is transmitted through the network composed of resistors 114, 97B and condenser 115, and with a time delay due to the characteristics of said network to the control anode of tube 76A so that, upon receiving the next positive pulse from the cathode of tube 74, tube 76A conducts, causing conduction in tube 75B to cease and preparing tube 76B for conduction on the next pulse from tube 74 in the manner described for tube 76A.

This action is repeated, tubes 76B, 77A, 77B, 78A, 78B, 75A . . . conducting in succession indefinitely. Each time tube 75A conducts, for example, a positive pulse is produced at the cathode of said tube which, if relay 8P—A is normal, is transmitted over conductor 116 to the control grid of pulsing tube 56 individual to the identifier shown in Fig. 3, actuating said tube in the manner previously described, and each time tube 75B conducts, a positive impulse is produced at the cathode of said tube which, on the one hand, is effective in extinguishing tube 75A and, on the other, is transmitted over conductor 116 if relay TP—A is operated, to actuate tube 56, to produce a positive pulse over the sleeve conductor 68 if such a pulse was not previously produced when tube 75A was conducting because of the operated condition of tube 75A.

It is evident since relays TP—B, TP—C and TP—D are severally associated with three other identifiers, positive pulses being produced in succession by each of the pulsing tubes 56 of said identifiers when, in the appropriate order and time a pulse is applied over conductor 117 when tube 76A is operated and relay TP—B is normal or when tube 76B is operated and relay TP—B is operated, over conductor 118 when tube 77A is operated and relay TP—C is normal or when tube 77B is operated and relay TP—C is operated, and over conductor 119 when tube 78A is operated and relay TP—D is normal or when tube 78B is operated and relay TP—D is operated. The cathode of tube 56 and similar pulsing tubes of said other three identifiers need only be connected to the extended sleeve conductors of lines, as previously described, during a period sufficient for each of said tubes to receive one pulse to identify the number for each of the stations on said lines.

A large number of lines are dependent for identification upon the potentials supplied to the bus-bars for actuating the gas discharge diode tubes connected therebetween. Therefore each bus-bar should be provided with an alarm circuit to give immediate warning of the failure of any of said potentials. Suitable alarm circuits are disclosed in Fig. 2. Each of the thousands-hundreds digits bus-bars TH00 . . . TH99 and each of the tens-units digits bus-bars TU00 . . . TU99 may be provided with an alarm circuit similar to that shown, as an example, associated with bus-bar TU67. The main anode of tube 120 which, in the present embodiment of the invention is a gas discharge triode tube of the cold cathode type, is supplied with alternating potential from the source 121 through the winding of relay A1, while the cathode of said tube is supplied with positive potential directly applied thereto. The difference of potential between the anode and the cathode of tube 120 is at no time sufficient to initiate conduction in said tube, but is sufficient to maintain conduction on negative cycles of alternating current. Negative potential applied through resistance 46 to bus-bar TU67, thence through resistances 122 and 123 to the control anode of tube 120 causes said tube to conduct on negative cycles of alternating current, operating relay A1. The discharge of condenser 124 through resistance 122 maintains the control anode of tube 120 sufficiently negative when positive pulses are received on bus-bar TU57 so that tube 120 does not cease to conduct during the period of said pulses. If, however, the negative potential through resistance 46 should fail, tube 120 will cease to conduct, releasing relay A1, which completes a circuit to an alarm (not shown) actuating said alarm.

Each of the office OFF–, thousands digit TH0 . . . TH9, hundreds digit H0 . . . H9, tens digit T0 . . . T9, and units digit U0 . . . U9 bus-bars may be provided with an alarm circuit similar to that shown, as an example, associated with bus-bar U0. Tube 125, which in the present embodiment of the invention is a gas discharge triode tube of the cold cathode type, is supplied with anode potential in a manner similar to tube 120, its cathode being connected to ground. Negative potential through resistance 47 to bus-bar U0, thence through resistance 127 to the control anode of tube 125 causes said tube to conduct on negative cycles of alternating current, operating relay A2. Positive pulses received on bus-bar U0 are insufficient to overcome the high potential supplied by battery B4 to the control anode of tube 125. However, should the potential through resistance 47 fail, tube 125 will cease to conduct, releasing relay A2 which completes the circuit of an alarm (not shown) actuating said alarm.

All of the tubes shown in the present embodiment of the invention are of the gas discharge type. However, it will be apparent to one skilled in the electronic art that other forms of tubes such as vacuum tubes or other discharge devices could readily be substituted to perform the functions of the tubes described.

What is claimed is:

1. In a telephone system, the combination with a line having a plurality of stations thereon and a device for each of said stations, of means responsive to a calling condition on one of said stations for applying a positive potential successively to each of said devices, means for determining which of said stations is the calling station, and means controlled by said last-mentioned means for applying a positive impulse to the device of said calling station coincidentally with the application of said positive potential thereto, thereby to operate said last-mentioned device.

2. A telephone system according to claim 2 in which the devices individual to the stations are gas-filled electronic tubes.

3. In a telephone system, the combination with a line having two stations thereon and gas-filled electronic devices individual to said stations, of means responsive to a calling condition on one of said stations for applying a positive potential successively to the devices of each of said stations, means for determining which of said stations is the calling station, and means controlled by said last-mentioned means for applying a positive impulse to the devices of said calling station coincidentally with the application of said positive potential thereto, thereby to operate said last-mentioned devices.

4. In a telephone system, the combination of a line having two stations thereon, a pair of gas-filled electronic devices individual to each of said stations, each of said stations having an identifying designation composed of digits or characters, means responsive to a calling condition on one of said stations for applying a positive potential alternately to each of said pair of devices, means for determining which of said stations is the calling station, means controlled by said station-determining means for applying a positive impulse to the pair of electronic devices of said calling station coincidentally with the application of said positive potential thereto, thereby to render said pair of devices conductive, and means responsive to the conductivity of said pair of devices for determining the identifying designation of said calling station.

5. A telephone system according to claim 4 in which the means controlled by said calling station-determining means includes an electronic device that is rendered conducting to produce said positive impulse at the time when said positive potential is applied to the pair of electronic devices of said calling station.

6. A telephone system according to claim 4 in which said means responsive to the conductivity of said pair of electronic devices comprises a first group of bus-bars to which said pair of electronic devices for each station is selectively connected according to certain combinations of digits or characters constituting a station's identifying designation, other groups of bus-bars, other electronic devices selectively interconnecting the bus-bars in the first group which are connected to the electronic devices of the stations with bus-bars in said other groups according to the individual digits or characters in said designations, said other electronic devices being rendered selectively conducting by the potential made available on the bus-bars of the first group by conductive electronic devices individual to the calling station, and means including a register responsive to the selective operation of said other electronic devices for determining and registering the identifying designation of said calling station.

7. In a telephone system, in combination, lines each having a plurality of stations thereon, each of said stations having an electron discharge device and an identifying designation, means for identifying the designation of each of said stations, said means comprising means responsive to a calling condition on one of said stations for rendering partially conducting all electron discharge devices severally belonging to the stations on the line containing the calling station, means for producing a plurality of time-spaced impulses, means for determining which of said stations is the calling station, means controlled by said calling station determining means for operating said impulse producing means to produce the one impulse individual to said calling station, means for applying said impulse to the electron discharge device of said station, thereby to render said electron discharge device fully conducting, and means responsive to the full conductivity of said electron discharge device for identifying the designation of said calling station.

No references cited.